United States Patent [19]
Beck et al.

[11] Patent Number: 5,866,533
[45] Date of Patent: Feb. 2, 1999

[54] POLYHYDROXYCARBOXYLIC ACID COMPOSITION DERIVED FROM MALTODEXTRINS BY OXIDATION WITH AN OXYGEN CONTAINING OXIDANT

[75] Inventors: Roland Herwig Friedrich Beck, Everberg; Hilde Odile Jozefine Lemmens, Kontich, both of Belgium

[73] Assignee: Cerestar Holding B.V., Las Sas van Gent, Netherlands

[21] Appl. No.: 678,711

[22] Filed: Jul. 11, 1996

[30] Foreign Application Priority Data

Nov. 7, 1995 [GB] United Kingdom .................. 95.14090

[51] Int. Cl.$^6$ ............................. C08B 37/16; C07H 1/00; A61K 31/70
[52] U.S. Cl. ........................... 510/471; 510/470; 514/58; 536/103; 536/105; 536/124
[58] Field of Search ..................................... 536/103, 124, 536/1.11, 105; 514/58; 510/470; 570/471

[56] References Cited

U.S. PATENT DOCUMENTS 3,974,033 8/1976 Harjej et al. ............................... 435/99
4,618,675 10/1986 Lichtenthaler et al. ................. 536/172

FOREIGN PATENT DOCUMENTS

| 103 373 | 1/1974 | Germany . |
| 1 425 822 | 2/1976 | United Kingdom . |
| 2 075 502 | 11/1981 | United Kingdom . |

OTHER PUBLICATIONS

Journal of Organic Chemistry, vol. 15, 1950 pp. 1264–1274 J.F. Haskins et al "The Alkaline Oxidation of Cellulose" p. 1268, pp. 1264–1274.

*Primary Examiner*—Elli Peselev
*Attorney, Agent, or Firm*—Pillsbury Madison & Sutro LLP

[57] ABSTRACT

The present invention a polyhydroxycarboxylic acid composition derived from maltodextrins by oxidation with an oxygen containing oxidant. The invention also relates to a process for the production of oxyacids from carbohydrates by oxidation with an oxygen containing oxidant. More particularly the present invention relates to the oxidation of starch hydrolysates or maltodextrins having a DE of less than 20. The invention further relates to oxidation products and the use thereof.

12 Claims, 3 Drawing Sheets

POLYHYDROXYCARBOXYLIC ACID COMPOSITION DERIVED FROM MALTODEXTRINS BY OXIDATION WITH AN OXYGEN CONTAINING OXIDANT

The present invention relates to polyhydroxycarboxylic acid compositions. The present invention further relates to a process for the production of polyhydroxycarboxylic acids from carbohydrates by oxidation with an oxygen containing oxidant. More particularly the present invention relates to the oxidation of maltodextrins and hydrolysis products of starches. The invention further relates to oxidation products obtained from maltodextrins and the use thereof as co-builder in detergents.

Oxidised starches are used widely in the paper and textile industries. The oxidation product is generally produced by treating starch with hypochlorite in an alkaline aqueous medium. Alternatively, oxidised starches are produced by oxidation with periodate which cleaves the glucoside unit of starch between the C-2 and C-3 atoms which are then converted into aldehyde groups. The oxidised starch thus produced is used mainly in the production of paper. The paper which contains oxidised starch was found to retain good mechanical strength.

Another potential application of oxidised starches or oxidised celluloses is the use as builders for detergents as described in German patent application DE-A-24 36 843. The products produced by oxidation with hypochlorite or periodate and subsequently with chlorite, contain multiple carboxylic acid groups in a single chain. This type of molecule has good sequestering powers. The use of this type of molecule is however limited by the finding that these substances become less biodegradable with increasing degree of oxidation.

Other methods of catalytic oxidation of carbohydrates are known and include the use molecular oxygen together with suitable catalysts.

DE-B-21 23 621 describes a process for the production of aldonic acids by catalytic oxidation of sugar alcohols, which do not contain free aldehyde or ketone groups, with oxygen or with an oxygen containing gas, in an alkaline medium, in the presence of a noble metal catalyst, particularly platinum or palladium.

EP-A-0 232 020 describes a process for the oxidation of water soluble saccharides to polyhydroxycarboxylic acids with molecular oxygen in an alkaline medium in the presence of a noble metal catalyst bound to an inert support, wherein the catalyst is doped with a metal of groups IV, V or VI of the periodic table, particularly Pb or Bi.

The mentioned catalysts are expensive and therefore cannot be applied in commercial processes without regeneration. This problem was partly solved by developing methods wherein other, cheaper catalysts could be used.

WO92/18542 discloses a method of oxidising carbohydrates, characterised in that the oxidation is effected by means of an oxygen containing gas in an aqueous alkaline medium in the presence of a catalytic quantity of a metal ion selected from the metals of group VIII of the periodic table, copper and silver, and a substance which acts as a ligand for the metal ion. Preferred ligands are polydentate amines.

EP-A-0 548 399 provides a method for the production of oxyacids from carbohydrates by catalytic oxidation with an oxygen containing gas, in an alkaline medium, characterised in that the oxidation is carried out by homogeneous catalysis in the presence of a catalytic amount of an ion of a transition metal selected from the group consisting of Cu, Cr, Co, Ni, Fe, V, Ti, Mn.

DD 103373 and U.S. Pat. No. 4,618,675 describe the uncatalysed oxidation of invert sugar, glucose and isomaltulose respectively.

GB 2,075,502 and GB 1,425,822 describe the uncatalysed oxidation of glucose syrup mixtures (DE 20–85) and maltodextrins (DE 20) and the use of the products in cementatious compositions.

From the above literature it becomes clear that a lot of effort has been made for improving oxidation of carbohydrates.

The present invention discloses that the combination of the use of molecules of partially degraded starch of appropriate molecular size and a non-catalysed oxidation reaction, results in a new product which shows very favourable characteristics as a co-builder in detergents.

The present invention provides a method for the oxidation of carbohydrates. The method is characterised in that an oxygen containing oxidant is used for the non-catalytic oxidation of maltodextrins having a DE value of less than 20, between 2 and 20, preferably between 11 and 14.

The oxidants of the present invention are oxygen containing oxidants having a redox potential $\epsilon_0 > 0.5$. Preferred oxidants are oxygen or oxygen containing gas mixtures and hydrogen peroxide or hydrogen peroxide generating sources.

The present invention discloses a composition comprising polyhydroxycarboxylic acids obtained by non-catalysed oxidation of maltodextrins, with an oxygen containing oxidant. The composition is preferably bleached and neutralised. Bleaching is preferably performed with hydrogen peroxide and the neutralisation is performed with an acid preferably citric acid. The product of the present oxidation reaction shows after a bleaching step a considerably increased colour stability under conditions simulating the use as a co-builder in detergents. After repeated washing cycles whiteness is retained and the built-up of inorganic incrustation on the fabric is limited.

Figure 1B:
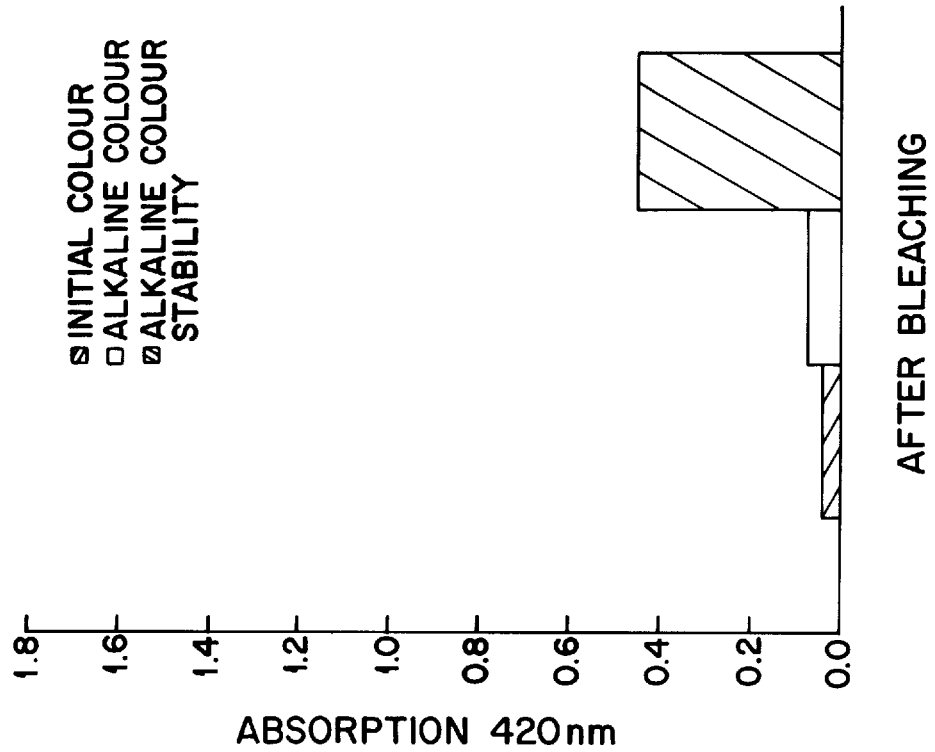
FIG. 1A and 1B show the effect of the bleaching step for improving the initial colour, the alkaline colour, and in particular the alkaline colour stability of the product of the present invention.

Carbohydrates, which constitute the substrate to which the oxidation method of the invention is applied, include polysaccharides, particularly maltodextrines or starch hydrolyzates. The term starch covers native starches extracted from various plants such as potato, rice, tapioca, maize and cereals, particularly maize and potato starch. Hydrolysis products of starch are constituted by mixtures of oligomers with various numbers of glucose units, including glucose monomers. These starch hydrolyzates are easily obtainable, for example, by enzymatic hydrolysis, preferably with the use of endoenzymes or by acid hydrolysis.

The preferred substrates are maltodextrins with a DE of less than 20, preferably between 2 and 20, more preferably maltodextrins with DE=11–14. The amount of substrate used during the oxidation reaction is generally between 5 and 60% wt (dry basis).

The oxidation is best performed under alkaline conditions. The preferred bases, for use in the process of the invention, are alkali and earth-alkali metal hydroxides, particularly, sodium hydroxide and calcium hydroxide, amines such as ethylamine, diethylamine, triethylamine, and ammonia or quaternary ammonium hydroxides. Basic salt may also be used, such as sodium carbonate and bicarbonate, provided that they are added in an amount such as to achieve the desired alkaline conditions. The alkaline agent is added to the reaction medium in a concentration such as to obtain an initial pH in the range of from 7.5 to 14, preferably from 8 to 13 and such as to maintain alkaline conditions throughout the reaction and neutralise the oxy-acids which constitute the reaction product.

The temperature of the reaction may be as low as room temperature, the preferred temperature for performing the reaction is between 40° and 80° C.

The product of the present oxidation reaction is composed of at least 50% polymeric material. This material is a mixture of polyhydroxycarboxylic acids and further contains degradation products. The amount of polymeric material obtained was found to be higher than when a catalysed reaction is used. The polymeric material was found to have a DE value at least 50% lower than the starting material. DE values were generally below 5 and values below 1 were commonly found. Acid hydrolysis was used to determine the structure of the polymeric material. It was found that the product was a maltodextrin wherein the reducing end was oxidised to arabinonic acid.

The colour stability of the product of the present invention was considerably increased by applying a bleaching step. Bleaching was performed using hydrogen peroxide the resulting product was neutralised with an acid preferably citric acid.

The product of the present invention was used in washing experiments a standard washing powder was used without co-builder, with Sokalan CP5 or with the present product as co-builder. After repeated washing cycles it was found that the fabric washed with the use of the product of the present invention as co-builder showed an almost 100% retained whiteness. Furthermore, also the amount of inorganic incrustation built-up was reduced, when compared with the use of detergent without co-builder or with Sokalan CP5.

Examples 1 and 2 illustrate the non-catalysed oxidation of maltodextrins using oxygen containing gas. The product contains a high amount of polymeric material which contains arabinonic acid as an end group.

Example 3 is a comparative example wherein the oxidation is catalysed with an iron-EDTA catalyst. From Table 1 it becomes clear that the non-catalysed reaction gives a higher yield of desired polymer and less degradation product.

Example 4 illustrates the non-catalysed oxidation using hydrogen peroxide as an oxidant.

Examples 5 to 7 show that the amount of oxidised polymer and the amount of degradation products formed are pH dependent. The amount of degradation product is again lower than with the use of oxygen gas combined with the iron-EDTA catalyst. The oxidised carbohydrates of the present invention are suitable for use in paper and textile industries as binders or as thickening agents or as co-builders in detergents.

Example 8 shows that the use of the oxidised maltodextrins of the present invention as a co-builder in washing tests results in an increased whiteness when compared with tests in the absence of a co-builder or in the presence of a standard polycarboxylate (Sokalan CP5). Even after 20 washing cycles there is no decrease in whiteness. It is further shown in this example that the amount of inorganic incrustation built-up is lower when oxidised maltodextrins are used.

EXAMPLE 1

The oxidation of maltodextrin with oxygen is performed in a 2 l glass autoclave with heating jacket, provided with a stirrer, a temperature control unit and an oxygen diffuser.

In the reactor, 400 g maltodextrin (dextrose equivalent value [DE]=11–14) is dissolved in 0.5 l demineralised water. The maltodextrin solution is saturated with oxygen gas. 306 g of a 45% w/w NaOH solution (molar ratio NaOH/anhydro glucose unit =1.4/1) is added to the maltodextrin solution. The oxygen pressure is adjusted to 2 bar and heating of the reaction mixture to 60° C. is started. The colour of the reaction mixture changes from yellow to brown due to the very high alkalinity. After 3 hours stirring at 60° C. under 2 bar oxygen pressure, the reaction is stopped, having a pH value of 11.0.

In order to improve the colour of the reaction mixture, a bleaching with 40.0 g of a 30% hydrogen peroxide solution is performed at 60° C. The resulting yellow coloured solution is eventually neutralised with for instance 42.5 g citric acid monohydrate. Surplus carbonate is removed by the addition of this acid and escapes quantitatively in the form of carbon dioxide.

The analytical results obtained before bleaching and neutralisation are summarised in table 1. The number of reducing end groups, expressed as dextrose equivalent, is strongly reduced and amounts to 0.92. The reaction mixture is composed of 56% polymeric material and 44% degradation products being $CO_2$, formic acid, glycolic acid, glyceric acid, and dihydroxy butyric acid.

Acid hydrolyses of the polymeric material enables the determination of the structure, being a maltodextrin whereby the reducing end is oxidised to arabinonic acid.

EXAMPLE 2

The procedure of example 1 is repeated at 80° C. and with increased alkali content (molar ratio NaOH/anhydro glucose unit=2/1).

In the reactor, 200 g maltodextrin (DE value=11–14) is dissolved in 0.8 l demineralised water. The maltodextrin solution is saturated with oxygen gas. 222 g of a 45% w/w NaOH solution is dosed to the maltodextrin solution. The reaction mixture is heated to 80° C. and the oxygen pressure is adjusted to 2 bar. After 3 hours stirring at 80 ° C. under 2 bar oxygen pressure, the reaction is stopped having a pH of 11.1. The reaction mixture is bleached with 6.7 g of a 30% hydrogen peroxide solution. The reaction mixture is neutralised with 45.54 g citric acid monohydrate and 4.45 g sulphuric acid 96%.

The analytical results, summarised in table 1, show a reduced DE value of 0.15, a polymer content of 63%, and a total sum of 37% degradation products. The structure of the reaction product is found to be identical to the product of example 1.

EXAMPLE 3 (Comparative example)

The procedure of example 2 is repeated in presence of an iron-EDTA catalyst. As catalyst $FeSO_4.7H_2O$ and 0.90 g $Na_2EDTA.2H_2O$ are added to the maltodextrin solution.

The analytical results, summarised in table 1, indicate a low polymer content of 44%, a high content of degradation products of 56% and a DE value of 0.78. The structure of the reaction product is identical as in example 1.

EXAMPLE 4

The oxidation of maltodextrin with hydrogen peroxide is performed in a 2 l glass reactor with a heating jacket, provided with a mechanical stirrer, a thermometer, a dosing pump for hydrogen peroxide, a pH control unit and a base delivery system.

In the reactor, 400 g maltodextrin (DE value=11–14) is dissolved in 0.45 l demineralised water. The maltodextrin solution is heated to 60° C. and adjusted initially to pH 12 by dosing a 45% w/w aqueous NaOH solution. 159 ml of a 30% hydrogen peroxide solution is dosed continuously over a time period of 3 hours to the maltodextrin solution (molar ratio hydrogen peroxide/reducing end group of maltodextrin=6/1). During the dosing of hydrogen peroxide, the reaction temperature is controlled and kept constant at 60° C., while the pH is adjusted to 11.2±0.1 by dosing NaOH 45% w/w solution. The total consumption of 45% w/w NaOH solution amounts to 190 ml. The reaction is continued until all hydrogen peroxide is consumed, typically after 3.5 hours. The colour of the reaction mixture is orange to brown.

In order to improve the colour of the reaction mixture itself and the colour stability under alkaline processing conditions, a bleaching step with 13.5 g of a 30% hydrogen peroxide solution is performed at 60° C. The pH controller was switched off, and the pH value was allowed to drop, typically to a value of 10.5. The resulting faintly yellow coloured solution is eventually neutralised with 18.8 g citric acid monohydrate.

The analytical results obtained before bleaching and neutralisation are summarised in table 2. The DE value is reduced to 0.62 after the reaction. The reaction mixture is composed of 67% polymeric material and 33% degradation products being $CO_2$, formic acid, glycolic acid, glyceric acid and dihydroxy butyric acid.

Acid hydrolyses of the polymeric material shows that the structure of the reaction product of the oxidation with hydrogen peroxide is identical to the reaction product resulting from an oxidation with oxygen gas as described in example 1 or 2.

The initial colour of the product is measured at 9% dry substance in demineralised water. The alkaline colour of the product is measured in a 20% w/v solution of sodium carbonate, pH approx. 12, at a co-builder dry substance concentration of 9%. The alkaline colour stability is measured by incubating the solution as prepared for the alkaline colour test for 30 minutes at 80° C. All colour measurements were taken at 420 nm using a spectrophotometer using a 1 cm cell.

Figure 1A:
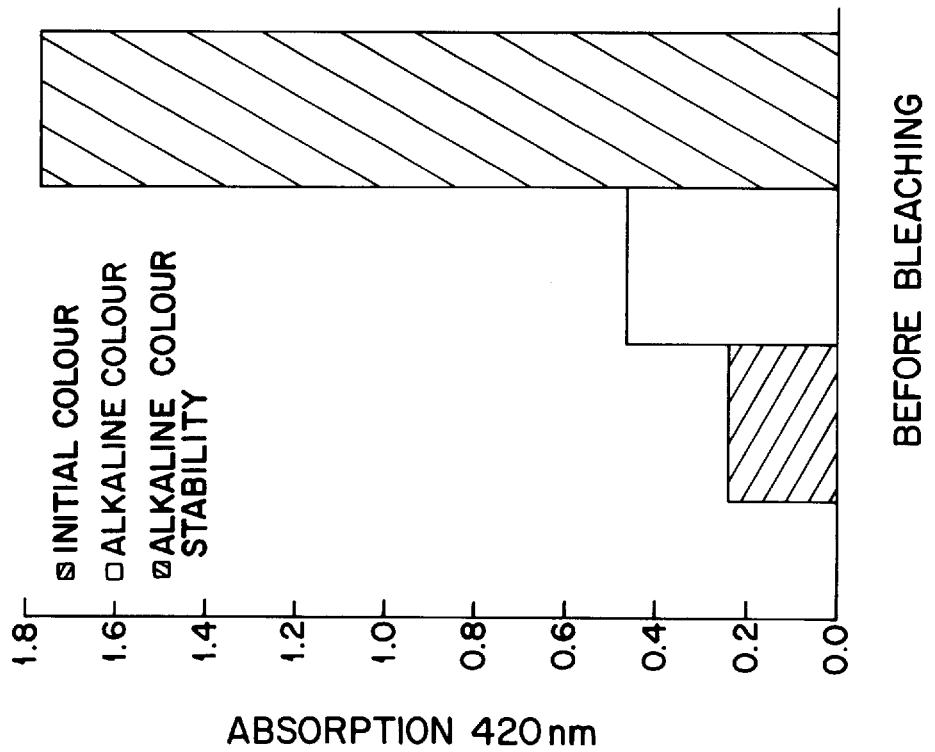

In FIGS. 1A and 1B effect of the bleaching step for improving the initial colour, the alkaline colour, and in particular the alkaline colour stability is demonstrated.

EXAMPLES 5–7

The procedure of example 4 is repeated at 80° C. and at different pH's 11, 10.5 and 10.0. The reaction conditions of the examples 5 to 7 and the obtained results are summarised in table 2. Decreasing the pH from 11 to 10.5 and 10.0, results in reaction products with increasing polymer content 51.4%, 59.0% and 64.0% respectively and increasing DE values of 0.70, 2.5 and 3.3 respectively.

EXAMPLE 8

The washing performance of the product obtained in Example 4 was evaluated using a Linitest laboratory dyeing and washfastness testing machine. Test conditions:

washing program at 60° C.

linen load: each container (in total 8) was filled with 5 pieces of white cotton tissue, 1 piece of cotton soiled with tea, and 1 piece with sebum fat, size: 5×5 cm water hardness: 25° French hardness detergent: standard zeolite built washing powder without co-builder, 5g/L concentration of the co-builder: 4% dry substance, based on the amount of detergent washing time: 1 hour the machine was washing in two directions using a toggle switch rinsing: 3 times for 5 minutes After each washing cycle, the tissues were dried and ironed. Evaluation of the tissues was done after 5, 10 and 20 washing cycles. The greying inhibition of the co-builder was determined by measuring the whiteness with a Minolta Spectrophotometer in the L,a,b mode. The inorganic incrustation was evaluated by determining the remaining ashes after burning the tissues at 1000° C. for 3 hours.

Figure 2:
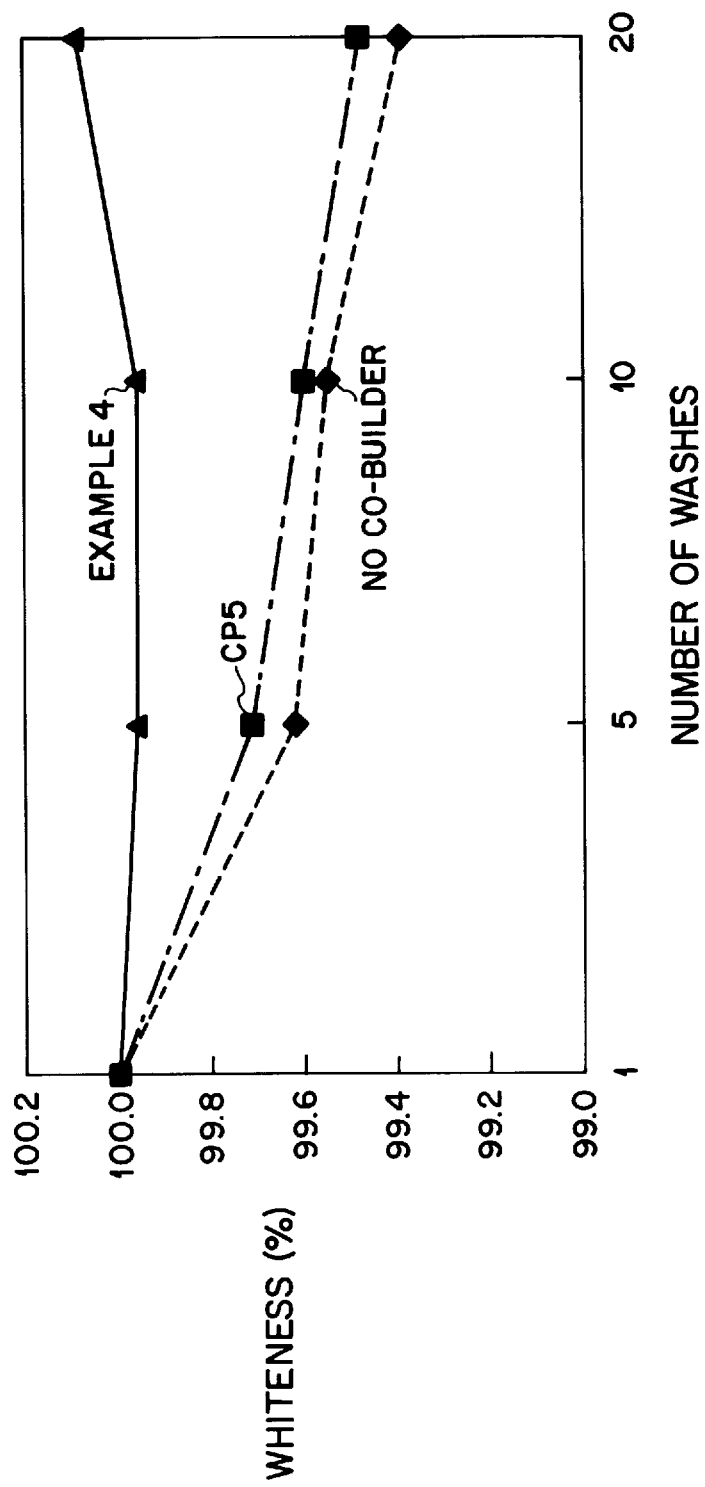
FIG. 2 shows the results of the whiteness measurements for washing powder without co-builder, a standard powder with the addition of 4% (dry substance) of Sokalan CP5 and a standard powder with 5% oxidised maltodextrin.
Figure 3:
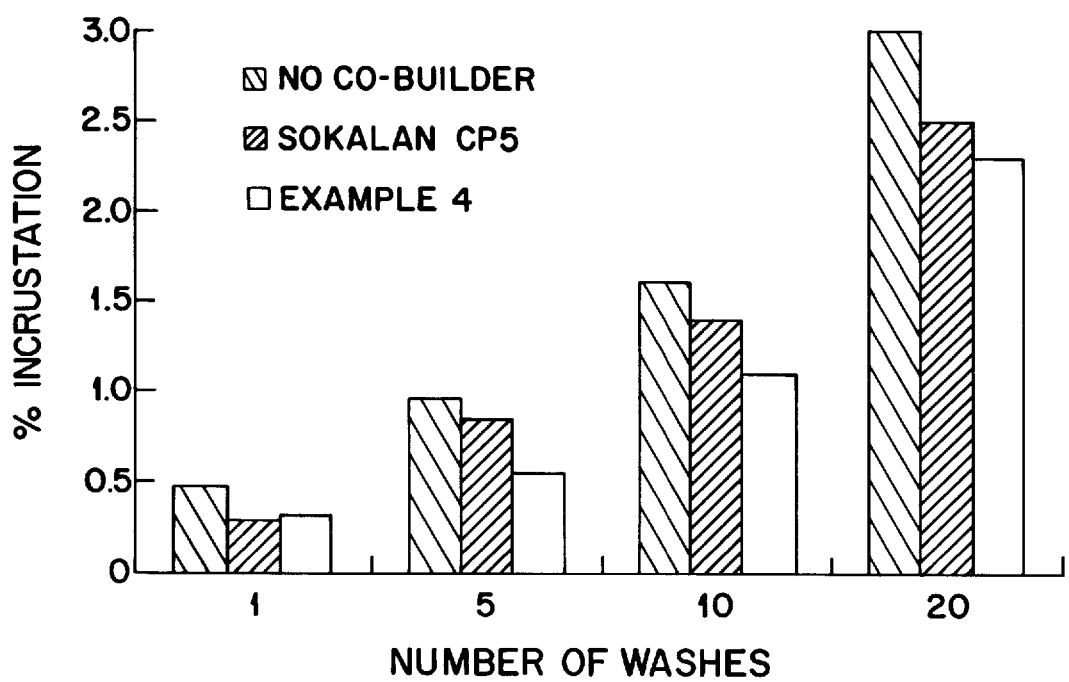
FIG. 3 shows the inorganic incrustation built-up as a function of the number of washing cycles for washing powder without co-builder, a standard powder with the addition of 4% (dry substance) of Sokalan CP5 and a standard powder with 5% oxidised maltodextrin of the present invention.

A standards the washing powder without co-builder, and a standard powder with the addition of 4% (dry substance) of Sokalan CP5 were used. In FIG. 2 the results of the whiteness measurements are shown, in FIG. 3 the inorganic incrustation in dependence of the washing cycle is shown.

TABLE 1

Oxygen oxidation of maltodextrin

| | Reaction conditions | | | | Analytical results | | | |
|---|---|---|---|---|---|---|---|---|
| Example | Temperature | Catalyst | molar ratio NaOH/AGU* | dry substance maltodextrin | Polymer content | Degradation products | DE-value after reaction | DE-value after bleaching, neutralis. |
| 1 | 60° C. | — | 1.4/1 | 40% | 56% | 44% | 0.92 | 0.80 |
| 2 | 80° C. | — | 2/1 | 20% | 63% | 37% | 0.15 | 0.10 |
| 3 | | $Fe^{++}$/EDTA | | | 43% | 57% | 0.78 | 0.30 | general reaction conditions: 3 hours reaction time, 2 bar oxygen pressure
*AGU = anhydro glucose unit

TABLE 2

Hydrogen peroxide oxidation of maltodextrin

| | Reaction conditions | | | | | Analytical results | |
|---|---|---|---|---|---|---|---|
| Example | Temperature | pH | Molar ratio $H_2O_2$/red.end | Polymer content | Degradation products | DE value after reaction | DE value bleaching, neutralis. |
| 4 | 60° C. | 11.2 | 6/1 | 67% | 33% | 0.62 | 0.45 |
| 5 | 80° C. | 11.0 | | 51% | 49% | 0.70 | 0.50 |
| 6 | | 10.5 | | 59% | 41% | 2.5 | 1.6 |
| 7 | | 10.0 | | 64% | 36% | 3.3 | 2.7 |

We claim:

1. A method for the production of oxidised maltodextrins comprising treating an initial maltodextrin with a DE value between 2 and 20 with an oxidising agent under alkaline conditions at a pH of at least about 10.5, wherein the oxidising agent is an oxygen containing oxidant with a redox potential under alkaline conditions of $\epsilon_0>+0.5$, to obtain a product mixture which contains said oxidised maltodextrins;

and bleaching and neutralising the product mixture.

2. A method according to claim 1, wherein the oxidant is oxygen gas or an oxygen containing gas mixture.

3. A method according to claim 1, wherein the oxidant is hydrogen peroxide or a hydrogen peroxide source.

4. A method according to claim 1, wherein the pH is between 11 and 14.

5. A method according to claim 1, wherein the maltodextrin having a DE of between 2 and 20 is used in the form of a solution in which the concentration of said maltodextrin is between 5% and 60% (dry basis).

6. A method according to claim 1, wherein said initial maltodextrin has a DE between 11 and 14.

7. An oxidation product in the form of a composition comprising polyhydroxycarboxylic acid salts with a residual DE of less than 5 and salts of citric acid.

8. An oxidation product produced by the method according to claim 1, wherein said oxidation product is in the form of a composition comprising at least one polyhydroxycarboxylic acid salt with a residual DE of less than 5 and at least one salt of citric acid.

9. A method for the production of oxidised maltodextrins according to claim 1, wherein said oxidised maltodextrins have a residual DE which is less than 5.

10. A method according to claim 1, wherein the neutralising is conducted using an acid comprising citric acid.

11. A detergent composition formulated from ingredients comprising a co-builder, said co-builder comprising oxidised maltodextrin obtained by treating an initial maltodextrin with a DE value between 2 and 20 with an oxidising agent under effective alkaline conditions, wherein the oxidising agent is an oxygen containing oxidant with a redox potential under alkaline conditions of $\epsilon_0>+0.5$.

12. A detergent composition according to claim 11, wherein the product of the oxidation is bleached and neutralised.

* * * * *